United States Patent
Kalina

(10) Patent No.: US 8,176,738 B2
(45) Date of Patent: May 15, 2012

(54) METHOD AND SYSTEM FOR CONVERTING WASTE HEAT FROM CEMENT PLANT INTO A USABLE FORM OF ENERGY

(75) Inventor: Alexander I. Kalina, Hillsborough, CA (US)

(73) Assignee: Kalex LLC, Belmonte, CA (US)

( * ) Notice: Subject to any disclaimer, the term of this patent is extended or adjusted under 35 U.S.C. 154(b) by 547 days.

(21) Appl. No.: 12/275,023

(22) Filed: Nov. 20, 2008

(65) Prior Publication Data

US 2010/0122533 A1  May 20, 2010

(51) Int. Cl.
 *F01K 25/06* (2006.01)
 *F01K 25/08* (2006.01)
(52) U.S. Cl. ............... 60/649; 60/651; 60/671
(58) Field of Classification Search .......... 60/649, 60/651, 671
See application file for complete search history.

(56) References Cited

U.S. PATENT DOCUMENTS

| | | |
|---|---|---|
| 3,146,761 A | 9/1964 | Blodgett |
| 3,696,587 A | 10/1972 | Young et al. |
| 3,712,073 A | 1/1973 | Arenson |
| 3,867,907 A | 2/1975 | Marsch et al. |
| 3,979,914 A | 9/1976 | Weber |
| 4,010,246 A | 3/1977 | Steinrotter et al. |
| 4,164,849 A | 8/1979 | Mangus |
| 4,183,225 A | 1/1980 | Politte et al. |
| 4,324,102 A | 4/1982 | Woinsky |
| 4,326,581 A | 4/1982 | Kalina |
| 4,346,561 A | 8/1982 | Kalina ......................... 60/673 |
| 4,392,353 A * | 7/1983 | Shibuya et al. ............... 60/657 |
| 4,433,545 A | 2/1984 | Chang |
| 4,442,679 A | 4/1984 | Stafford et al. |
| 4,489,563 A | 12/1984 | Kalina ......................... 60/673 |
| 4,548,043 A | 10/1985 | Kalina ......................... 60/673 |
| 4,586,340 A | 5/1986 | Kalina ......................... 60/673 |
| 4,604,867 A | 8/1986 | Kalina ......................... 60/653 |
| 4,619,809 A | 10/1986 | Schluderberg |
| 4,674,285 A | 6/1987 | Durrant et al. |
| 4,704,877 A | 11/1987 | Selcukoglu |
| 4,732,005 A | 3/1988 | Kalina ......................... 60/673 |
| 4,739,713 A | 4/1988 | Vier et al. |

(Continued)

FOREIGN PATENT DOCUMENTS

DE  1925234 A1  12/1970

(Continued)

OTHER PUBLICATIONS

U.S. Appl. No. 11/227,991, filed Sep. 15, 2005, Kalina.

(Continued)

*Primary Examiner* — Hoang Nguyen
(74) *Attorney, Agent, or Firm* — Robert W Strozier

(57) ABSTRACT

Methods and systems for converting waste heat from cement plant into a usable form of energy are disclosed. The methods and systems make use of two heat source streams from the cement plant, a hot air stream and a flue gas stream, to fully vaporize and superheat a working fluid stream, which is then used to convert a portion of its heat to a usable form of energy. The methods and systems utilize sequential heat exchanges stages to heat the working fluid stream, first with the hot air stream or from a first heat transfer fluid stream heated by the hot air stream and second with the flue gas stream from a second heat transfer fluid stream heated by the hot air stream.

16 Claims, 10 Drawing Sheets

U.S. PATENT DOCUMENTS

| | | | | |
|---|---|---|---|---|
| 4,753,758 | A | 6/1988 | Miller | |
| 4,763,480 | A | 8/1988 | Kalina | 60/649 |
| 4,817,392 | A | 4/1989 | Agrawal et al. | |
| 4,819,437 | A | 4/1989 | Dayan | |
| 4,832,718 | A | 5/1989 | Mehra | |
| 4,899,545 | A | 2/1990 | Kalina | 60/673 |
| 4,982,568 | A | 1/1991 | Kalina | 60/649 |
| 5,019,143 | A | 5/1991 | Mehrta | |
| 5,029,444 | A | 7/1991 | Kalina | 60/673 |
| 5,038,567 | A | 8/1991 | Mortiz | |
| 5,095,708 | A | 3/1992 | Kalina | 60/673 |
| 5,103,899 | A | 4/1992 | Kalina | 165/104.13 |
| 5,440,882 | A | 8/1995 | Kalina | 60/641.2 |
| 5,450,821 | A | 9/1995 | Kalina | 122/1 R |
| 5,572,871 | A | 11/1996 | Kalina | 60/649 |
| 5,588,298 | A | 12/1996 | Kalina et al. | 60/676 |
| 5,603,218 | A | 2/1997 | Hooper | |
| 5,649,426 | A | 7/1997 | Kalina et al. | 60/649 |
| 5,754,613 | A | 5/1998 | Hashiguchi et al. | |
| 5,784,888 | A | 7/1998 | Termuehlen | |
| 5,797,981 | A | 8/1998 | Collin et al. | |
| 5,822,990 | A | 10/1998 | Kalina et al. | 60/649 |
| 5,893,410 | A | 4/1999 | Halbrook | |
| 5,950,433 | A | 9/1999 | Kalina | 60/649 |
| 5,953,918 | A | 9/1999 | Kalina et al. | 60/653 |
| 6,015,451 | A | 1/2000 | Anderson et al. | |
| 6,035,642 | A | 3/2000 | Peletz et al. | |
| 6,058,695 | A | 5/2000 | Ranasinghe et al. | |
| 6,065,280 | A | 5/2000 | Ranasinghe et al. | |
| 6,158,220 | A | 12/2000 | Hansen et al. | |
| 6,158,221 | A | 12/2000 | Fancher et al. | |
| 6,167,705 | B1 | 1/2001 | Hansen et al. | |
| 6,170,263 | B1 | 1/2001 | Chow et al. | |
| 6,195,998 | B1 | 3/2001 | Hansen et al. | |
| 6,202,418 | B1 | 3/2001 | Gabrielli et al. | |
| 6,223,535 | B1 | 5/2001 | Kitz | |
| 6,347,520 | B1 | 2/2002 | Ranasinghe et al. | |
| 6,464,492 | B1 | 10/2002 | Guarco et al. | 432/91 |
| 6,735,948 | B1 | 5/2004 | Kalina | 60/649 |
| 6,769,256 | B1 | 8/2004 | Kalina | 60/649 |
| 6,820,421 | B2 | 11/2004 | Kalina | 60/649 |
| 6,829,895 | B2 | 12/2004 | Kalina | 60/649 |
| 6,910,334 | B2 | 6/2005 | Kalina | 60/651 |
| 6,923,000 | B2 | 8/2005 | Kalina | 60/649 |
| 6,941,757 | B2 | 9/2005 | Kalina | 60/649 |
| 6,968,690 | B2 * | 11/2005 | Kalina | 60/649 |
| 7,021,060 | B1 | 4/2006 | Kalina | 60/649 |
| 7,043,919 | B1 | 5/2006 | Kalina | 60/651 |
| 7,055,326 | B1 | 6/2006 | Kalina | 60/649 |
| 7,065,967 | B2 | 6/2006 | Kalina | 60/649 |
| 7,065,969 | B2 | 6/2006 | Kalina | 60/670 |
| 7,104,784 | B1 | 9/2006 | Hasegawa et al. | 431/4 |
| 7,197,876 | B1 | 4/2007 | Kalina | 60/649 |
| 7,264,654 | B2 | 9/2007 | Kalina | 95/228 |
| 7,347,049 | B2 * | 3/2008 | Rajendran et al. | 60/649 |
| 7,350,471 | B2 | 4/2008 | Kalina | 110/348 |
| 7,356,993 | B2 * | 4/2008 | Smith | 60/651 |
| 7,398,651 | B2 | 7/2008 | Kalina | 60/649 |
| 2003/0154718 | A1 | 8/2003 | Nayar | |
| 2003/0167769 | A1 | 9/2003 | Bharathan | |
| 2004/0050048 | A1 | 3/2004 | Kalina | |
| 2004/0055302 | A1 | 3/2004 | Kalina | |
| 2004/0069015 | A1 | 4/2004 | Paradowski | |
| 2004/0148935 | A1 | 8/2004 | Kalina | |
| 2004/0182084 | A1 | 9/2004 | Kalina | |
| 2005/0050891 | A1 | 3/2005 | Kalina | |
| 2005/0061654 | A1 | 3/2005 | Kalina | 203/21 |
| 2005/0066661 | A1 | 3/2005 | Kalina | |
| 2005/0183418 | A1 | 8/2005 | Kalina | |
| 2005/0235645 | A1 | 10/2005 | Kalina | |
| 2006/0096288 | A1 | 5/2006 | Kalina | 60/649 |
| 2006/0096289 | A1 | 5/2006 | Kalina | |
| 2006/0096290 | A1 | 5/2006 | Kalina | 60/649 |
| 2006/0165394 | A1 | 7/2006 | Kalina | 392/386 |
| 2006/0199120 | A1 | 9/2006 | Kalina | 431/9 |
| 2007/0056284 | A1 | 3/2007 | Kalina | |
| 2007/0068161 | A1 | 3/2007 | Kalina | |
| 2007/0234722 | A1 | 10/2007 | Kalina | |
| 2007/0234750 | A1 | 10/2007 | Kalina | |
| 2008/0000225 | A1 | 1/2008 | Kalina | |
| 2008/0053095 | A1 | 3/2008 | Kalina | |
| 2010/0083662 | A1 | 4/2010 | Kalina | |
| 2010/0101227 | A1 | 4/2010 | Kalina | |
| 2010/0122533 | A1 | 5/2010 | Kalina | |
| 2010/0146973 | A1 | 6/2010 | Kalina | |
| 2010/0205962 | A1 | 8/2010 | Kalina | |
| 2011/0024084 | A1 | 2/2011 | Kalina | |
| 2011/0067400 | A1 | 3/2011 | Kalina | |
| 2011/0174296 | A1 | 7/2011 | Kalina | |

FOREIGN PATENT DOCUMENTS

| | | |
|---|---|---|
| DE | 3933731 A1 | 4/1990 |
| DE | 10335143 A1 | 2/2005 |
| EP | 0280453 A | 8/1988 |
| EP | 0472020 A | 2/1992 |
| EP | 0652368 A | 5/1995 |
| EP | 0694678 A | 1/1996 |
| EP | 0740052 A | 10/1996 |
| EP | 0949406 A | 10/1999 |
| EP | 0952316 A | 10/1999 |
| EP | 1058069 A | 12/2000 |
| EP | 1217299 A | 6/2002 |
| EP | 1254696 A | 11/2002 |
| EP | 1331444 A | 7/2003 |
| EP | 1936129 A2 | 6/2008 |
| FR | 1111784 A | 3/1956 |
| FR | 2821351 A | 8/2002 |
| FR | 2885169 A | 11/2006 |
| GB | 340780 A | 1/1931 |
| GB | 504114 A | 4/1939 |
| GB | 798786 A | 7/1958 |
| GB | 2335953 A | 10/1999 |
| JP | 61041850 A | 2/1986 |
| JP | 06026441 A | 2/1994 |
| KR | 100846128 B1 | 7/2008 |
| WO | WO9407095 | 3/1994 |
| WO | WO 01/19749 * | 3/2001 |
| WO | WO0165101 | 9/2001 |
| WO | WO03048529 | 6/2003 |
| WO | WO2004001288 | 12/2003 |
| WO | WO2004033962 | 4/2004 |
| WO | WO2004070173 | 8/2004 |
| WO | WO2004102082 | 11/2004 |
| WO | WO2004109075 | 12/2004 |

OTHER PUBLICATIONS

U.S. Appl. No. 11/235,654, filed Sep. 22, 2005, Kalina.
U.S. Appl. No. 11/238,173, filed Sep. 28, 2005, Kalina.
U.S. Appl. No. 11/399,287, filed Apr. 5, 2006, Kalina.
U.S. Appl. No. 11/399,306, filed Apr. 5, 2006, Kalina.
U.S. Appl. No. 11/514,290, filed Aug. 31, 2006, Kalina.

* cited by examiner

US 8,176,738 B2

METHOD AND SYSTEM FOR CONVERTING WASTE HEAT FROM CEMENT PLANT INTO A USABLE FORM OF ENERGY

BACKGROUND OF THE INVENTION

1. Field of the Invention

The present invention, generally, relates to a system and method for the effective utilization of waste heat from cement kilns to produce usable forms of power.

More particularly, the present invention, generally, relates to a system and method for the effective utilization of waste heat from cement kilns to produce usable forms of power, where the system includes a cement plant CP, a heat exchange unit HEU having sequential heat exchanges stages for transferring heat from two heat source stream produced by the cement plant CP, and a power plant PP.

2. Description of the Related Art

Usually, cement kilns produce two streams of waste heat; a stream of flue gas and a stream of hot air. The flow rate of the flue gas is usually larger than the flow rate of the hot air. The initial temperature of the flue gas is higher than the initial temperature of the hot air. In a typical application of this sort, the stream of flue gas is returned to the kiln after it is partially cooled, where it is then used to pre-heat the raw materials used in cement production.

This type of system imposes a limit on the final temperature to which the flue gas can be cooled in a power system. The final temperature to which the flue gas can be cooled is substantially higher than the final temperature to which the stream of hot air can be cooled.

Thus, there is a need in the art for a more effective and efficient system and method for improved power extraction from cement kiln waste stream, which, because of the two waste stream have different temperature and different heat exchange characteristics, uses separate heat exchanger apparatuses, one for the flue gas and one for the hot air.

SUMMARY OF THE INVENTION

Embodiments of the power extraction system of this invention include a cement plant producing a hot air stream and a flue gas stream. The system also includes a heat exchange apparatus including: (1) a first heat exchange stage adapted to heat a fully condensed, multi-component working fluid stream in counterflow with a first heat source stream to form a partially vaporized, multi-component working fluid stream and a cooled first heat source stream; and (2) a second heat exchange stage adapted to heat the partially vaporized, multi-component working fluid stream in counterflow with a second heat source stream to form a fully vaporized and superheated, working fluid stream and a cooled second heat source stream. The system also includes a power plant including: (1) an energy extraction unit adapted to convert a portion of thermal energy in the fully vaporized and superheated, working fluid stream into a usable form of energy and to form a spent, multi-component working fluid stream; and (2) a condensation unit adapted to condense the spent, multi-component working fluid stream thermal to form the fully condensed, multi-component working fluid stream.

In certain embodiments, the first heat source stream is the hot air stream and the cooled flue gas stream is returned to the cement plant to preheat materials for use in the cement plant and/or the second heat source stream is the flue stream and the cooled flue gas stream is returned to the cement plant to preheat materials for use in the cement plant.

In other embodiments, the condensation unit preheats the fully condensed working fluid stream.

In other embodiments, the condensation unit comprises a simple condenser, a distillation-condensation subsystem DCSS or a condensation thermal compression subsystem CTCSS preheats the fully condensed working fluid stream.

In other embodiments, the system can further include a hot air stream particulate separation and heat transfer subsystem including a hot air particulate separation and heat transfer unit adapted to heat a first high temperature heat transfer fluid stream with the hot air stream to form a heated first high temperature heat transfer fluid stream and the cooled air stream, where the first heat source stream is the heated first high temperature heat transfer fluid stream and the second heat source stream is the flue gas stream.

In other embodiments, the system can further include a flue gas stream particulate separation and heat transfer subsystem including a flue gas particulate separation and heat transfer unit adapted to heat a second high temperature heat transfer fluid stream with the flue gas stream to form a heated second high temperature heat transfer fluid stream and the cooled flue gas stream, where the first heat source stream is the hot air stream and the second heat source stream is the heated second high temperature heat transfer fluid stream.

In other embodiments, the system of this invention includes (1) a hot air particulate separation and heat transfer unit adapted to heat a first high temperature heat transfer fluid stream with the hot air stream to form a heated first high temperature heat transfer fluid stream and the cooled air stream, and (2) a flue gas particulate separation and heat transfer unit adapted to heat a second high temperature heat transfer fluid stream with the flue gas stream to form a heated second high temperature heat transfer fluid stream and the cooled flue gas stream, where the first heat source stream is the heated first high temperature heat transfer fluid stream and the second heat source stream is the heated second high temperature heat transfer fluid stream.

In certain embodiments, the particulate separation and heat transfer units comprise: (1) a large particle separator adapted to remove substantially all large particles from either the hot air stream or the flue gas stream, (2) a scrubber adapted to heat the heat transfer fluid streams with heat from the hot air stream or the flue gas, (3) a pump adapted to circulated the heated heat transfer fluid streams into the heat exchange unit, and (4) a filter for removing the dust from the transfer fluid streams or the hot air streams or the flue gas stream so that the streams going to the heat exchange unit are substantially dust free.

Embodiment of methods for producing usable energy from heat sources stream derived from a cement plant of this invention include supplying a hot air stream and a flue gas stream from a cement plant. The method also includes heating a fully condensed, multi-component working fluid stream with the heat derived directly or indirectly from the hot air stream in a first stage of a heat exchange unit to form a partially vaporized, multi-component working fluid stream and a cooled air stream. The method also includes heating the partially vaporized, multi-component working fluid stream with the heat derived directly or indirectly from the flue gas stream in a second stage of the heat exchange unit to form a fully vaporized and superheated, multi-component working fluid stream and a cooled flue gas stream. The method also includes converting a portion of thermal energy in the fully vaporized and superheated, multi-component working fluid stream to a usable form of energy to form a spent, multi-component working fluid stream. The method also include condensing the spent, multi-component working fluid stream to form the fully condensed, multi-component working fluid stream.

In certain embodiments, the method further includes returning the cooled air stream to the cement plant, and/or returning the cooled flue gas stream to the cement plant.

In other embodiments, the method further includes: (1) passing the hot air stream through a large particle separator of a particulate separation and heat transfer subsystem to form a dust laden hot air stream; (2) transferring heat from the dust laden hot air stream to a first high temperature heat transfer fluid stream in a scrubber to form the cooled air stream and a heated first high temperature heat transfer fluid stream; (3) pressurizing the heated first high temperature heat transfer fluid stream to form a higher pressure, heated first high temperature heat transfer fluid stream, and (4) filtering the higher pressure, heated first high temperature heat transfer fluid stream to form a substantially dust free, higher pressure, heated first high temperature heat transfer fluid stream, which is used to partially vaporize the fully condensed, multi-component working fluid stream in the first stage of the heat exchange unit.

In other embodiments, the method further includes: (1) passing the flue gas stream through a large particle separator of a particulate separation and heat transfer subsystem to form a dust laden flue gas stream, (2) transferring heat from the dust laden flue gas stream to a second high temperature heat transfer fluid stream in a scrubber to form the cooled flue gas stream and a heated second high temperature heat transfer fluid stream, (3) pressurizing the heated second high temperature heat transfer fluid stream to form a higher pressure, heated second high temperature heat transfer fluid stream, and (4) filtering the higher pressure, heated second high temperature heat transfer fluid stream to form a substantially dust free, higher pressure, heated second high temperature heat transfer fluid stream, which is used to fully vaporize and superheat the partially vaporized, multi-component working fluid stream in the second stage of the heat exchange unit.

In other embodiments, the method further includes: (1) passing the hot air stream through a first large particle separator of a particulate separation and heat transfer subsystem to form a dust laden hot air stream, (2) transferring heat from the dust laden hot air stream to a first high temperature heat transfer fluid stream in a first scrubber to form the cooled air stream and a heated first high temperature heat transfer fluid stream, (3) pressurizing the heated first high temperature heat transfer fluid stream to form a higher pressure, heated first high temperature heat transfer fluid stream, (4) filtering the higher pressure, heated first high temperature heat transfer fluid stream to form a substantially dust free, higher pressure, heated first high temperature heat transfer fluid stream, which is used to partially vaporize the fully condensed, multi-component working fluid stream in the first stage of the heat exchange unit, (5) passing the flue gas stream through a second large particle separator of a particulate separation and heat transfer subsystem to form a dust laden flue gas stream, (6) transferring heat from the dust laden flue gas stream to a second high temperature heat transfer fluid stream in a second scrubber to form the cooled flue gas stream and a heated second high temperature heat transfer fluid stream, (7) pressurizing the heated second high temperature heat transfer fluid stream to form a higher pressure, heated second high temperature heat transfer fluid stream, and (8) filtering the higher pressure, heated second high temperature heat transfer fluid stream to form a substantially dust free, higher pressure, heated second high temperature heat transfer fluid stream, which is used to fully vaporize and superheat the partially vaporized, multi-component working fluid stream in the second stage of the heat exchange unit.

In other embodiments, the method further includes: (1) passing the hot air stream through a large particle separator of a particulate separation and heat transfer subsystem to form a dust laden hot air stream, (2) pressurizing the dust laden hot air stream to form a higher pressure, dust laden hot air stream, (3) filtering the higher pressure, dust laden hot air stream to form a substantially dust free, higher pressure, hot air stream, and (4) transferring heat from the substantially dust free, higher pressure, hot air stream to a first high temperature heat transfer fluid stream in a scrubber to form the cooled air stream and a heated first high temperature heat transfer fluid stream, which is used to partially vaporize the fully condensed, multi-component working fluid stream in the first stage of the heat exchange unit.

In other embodiments, the method further includes (5) pressurizing the heated first high temperature heat transfer fluid stream to form a higher pressure, heated first high temperature heat transfer fluid stream, before being forwarded to the first stage of the heat exchange unit.

In other embodiments, the method further includes: (1) passing the flue gas stream through a large particle separator of a particulate separation and heat transfer subsystem to form a dust laden flue gas stream, (2) pressurizing the dust laden flue gas stream to form a higher pressure, dust laden flue gas stream, (3) filtering the higher pressure, dust laden flue gas stream to form a substantially dust free, higher pressure, flue gas stream, and (4) transferring heat from the substantially dust free, higher pressure, flue gas stream to a second high temperature heat transfer fluid stream in a scrubber to form the cooled flue gas stream and a heated second high temperature heat transfer fluid stream, which is used to fully vaporize and superheat the partially vaporized, multi-component working fluid stream in the second stage of the heat exchange unit.

In other embodiments, the method further includes (5) pressurizing the heated second high temperature heat transfer fluid stream to form a higher pressure, heated second high temperature heat transfer fluid stream, before being forwarded to the second stage of the heat exchange unit.

In other embodiments, the method further includes: (1) passing the hot air stream through a large particle separator of a particulate separation and heat transfer subsystem to form a dust laden hot air stream, (2) pressurizing the dust laden hot air stream to form a higher pressure, dust laden hot air stream, (3) filtering the higher pressure, dust laden hot air stream to form a substantially dust free, higher pressure, hot air stream, (4) transferring heat from the substantially dust free, higher pressure, hot air stream to a first high temperature heat transfer fluid stream in a scrubber to form the cooled air stream and a heated first high temperature heat transfer fluid stream, which is used to partially vaporize the fully condensed, multi-component working fluid stream in the first stage of the heat exchange unit, (5) passing the flue gas stream through a large particle separator of a particulate separation and heat transfer subsystem to form a dust laden flue gas stream, (6) pressurizing the dust laden flue gas stream to form a higher pressure, dust laden flue gas stream, (7) filtering the higher pressure, dust laden flue gas stream to form a substantially dust free, higher pressure, flue gas stream, and (8) transferring heat from the substantially dust free, higher pressure, flue gas stream to a second high temperature heat transfer fluid stream in a scrubber to form the cooled flue gas stream and a heated second high temperature heat transfer fluid stream, which is used to fully vaporize and superheat the partially vaporized, multi-component working fluid stream in the second stage of the heat exchange unit.

In other embodiments, the method further includes: (9) pressurizing the heated first high temperature heat transfer fluid stream to form a higher pressure, heated first high temperature heat transfer fluid stream, before being forwarded to the first stage of the heat exchange unit, and (10) pressurizing the heated second high temperature heat transfer fluid stream to form a higher pressure, heated first high temperature heat transfer fluid stream, before being forwarded to the second stage of the heat exchange unit.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1A:
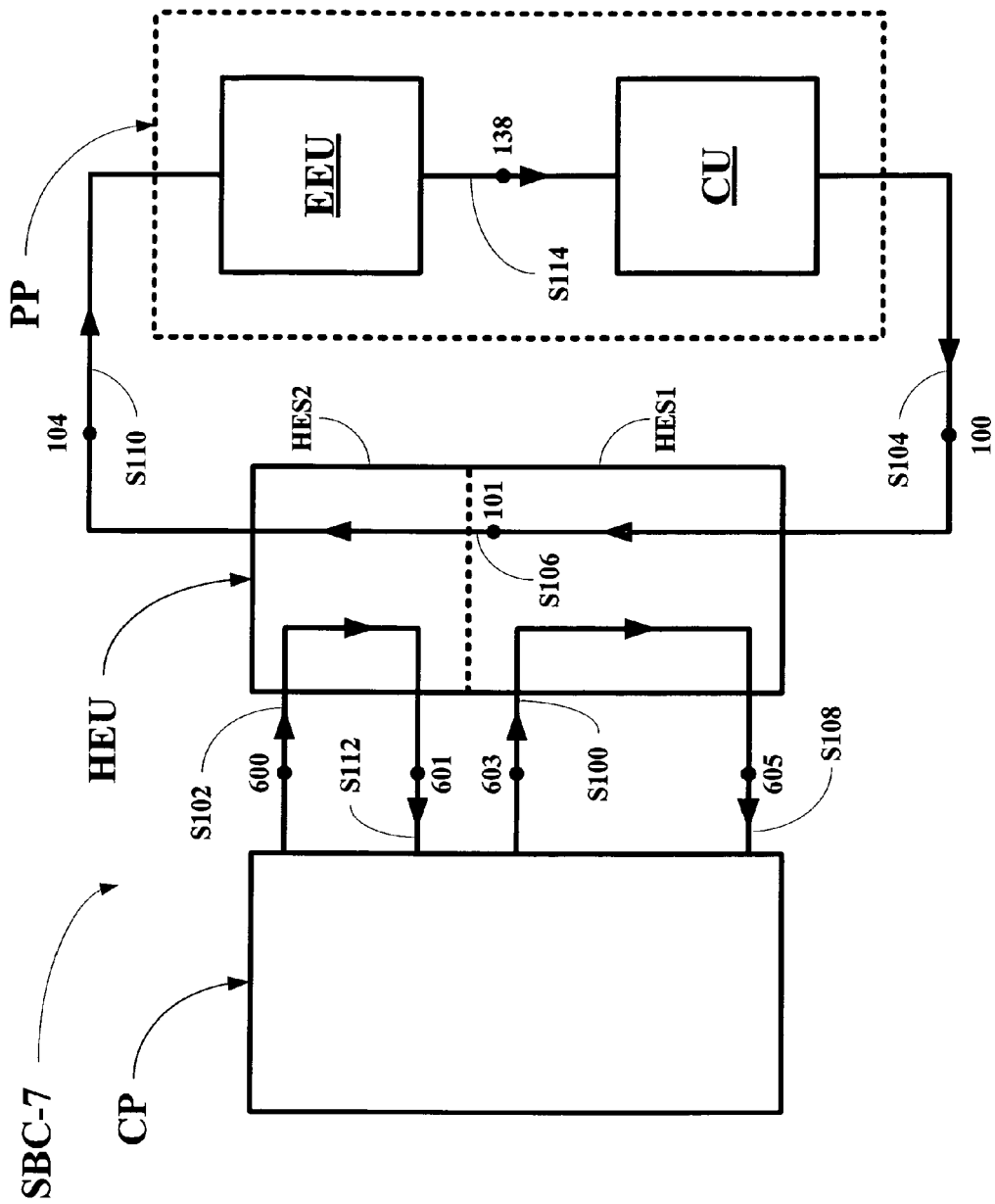
FIG. 1A depicts an embodiment of a system for extracting heat energy from a cement kiln that produces two heat source streams, a flue gas stream and a hot air stream, where the system includes a cement plant CP, a heat exchange unit HEU, and a power plant PP.

The inventor has found that an improved heat exchanger arrangement can be implemented in cement kiln plants that produce two heat source streams, a hot air stream and a flue gas stream. The heat exchanger arrangement comprises two heat exchange apparatuses, one for use with the hot air stream and one for use with the flue gas stream. The inventor has also found that if particulate and dust erosion is a problem, then the two stream can be pretreated to remove particulate and dust before entering the heat exchanger apparatuses or can be pretreated to remove particulate and dust, while transferring their heat to separate high temperature heat transfer fluid, which are then sent into the heat exchanger apparatuses.

Embodiments of the present invention broadly relates to an improved system for extracting thermal energy from cement kilns that produce a hot air stream and a flue gas stream, where the system include a sequential heat exchanger arrangement adapted to fully vaporize and superheat a fully condensed multi-component working fluid (which may also be preheated), with heat from the two stream. This fully vaporized and superheated multi-component working fluid is then sent into a power extraction unit where a portion of its thermal energy is converted into a usable form of energy such as electric power. After energy extraction, the spent working fluid is sent to a condenser unit, where it is fully condensed and optionally preheated.

Embodiments of the present invention broadly relates to an improved method for extracting thermal energy from cement kilns that produce a hot air stream and a flue gas stream, where the method includes supplying a first heat source stream to a first heat exchange apparatus. The first heat source stream can be the hot air stream or a first high temperature heat transfer fluid heated by the hot air stream. The method also includes supplying a fully condensed, multi-component working fluid stream from a condensation unit of a power plant, which may also be preheated. The method also includes partially vaporizing the fully condensed, multi-component working fluid stream in the first heat exchange apparatus with heat from the first heat source stream in a first counterflow heat exchange process. The method further includes supplying a second heat source stream to a second heat exchange apparatus, sequential to the first heat exchange apparatus. The second heat source stream can be the flue gas stream or a second high temperature heat transfer fluid heated by the flue gas stream. The method also includes fully vaporizing and superheating the partially vaporized multi-component working fluid stream in the second heat exchange apparatus with heat from the second heat source stream in a second counterflow heat exchange process. The process also includes converting a portion of thermal energy in the fully vaporized and superheated working fluid stream to a useable form of energy in a energy extraction unit of the power plant. The process is completed by fully condensing and optionally preheating a spent working fluid stream to from the fully condensed, optionally preheated working fluid stream in the condensation unit of the power plant.

Embodiments of the present invention broadly relates to a subsystem and method for sequential heating unto vaporization and superheating a multi-component working fluid stream. The subsystem includes a first heat exchange apparatus and a second heat exchange apparatus in sequential arrangement. In an alternate embodiment, the subsystem includes a two stage heat exchange apparatus. A first cement plant derived heat source stream is used to partially vaporize a fully condensed, working fluid stream, which may be preheated; while a second cement plant derived heat source stream is sued to fully vaporize and superheat the partially vaporized working fluid stream. The method includes the supplying of the two heat source stream and the two heat exchange processes that transfer heat from the heat source streams to the working fluid stream to produce a fully vaporized, superheated working fluid stream from a fully condensed working fluid stream, which may be also preheated. The fully condensed working fluid stream is derived from a condensation unit of a power plant; while the fully vaporized, superheated working fluid stream is used by the power plant to convert a portion of its heat to a usable form of energy such as electrical energy.

Suitable Reagents

Suitable multi-component working fluid for use in the systems of this inventions include, without limitation, any fluid that comprises at least one lower boiling point material—the low boiling component—and at least one higher boiling point material—the high boiling component. In certain embodiments, the multi-component working fluids include, without limitation, an ammonia-water mixture, a mixture of two or more hydrocarbons, a mixture of two or more freons, a mixture of hydrocarbons and freons, or similar fluid having two or more components having different boiling points. In general, the fluid can comprise mixtures of any number of compounds with favorable thermodynamic characteristics and solubilities. In a certain embodiments, the multi-component working fluid comprises a mixture of water and ammonia.

Suitable heat transfer fluids include, without limitation, metal fluids such as lithium, sodium, or other metal used as high temperature heat transfer fluids, synthetic or naturally derived high temperature hydrocarbon heat transfer fluids, silicon high temperature heat transfer fluids or any other heat transfer fluid suitable for use with hot flue gas effluent stream from cement plants.

DETAILED DESCRIPTION OF THE DRAWINGS OF THE INVENTION

Entire Systems

FIG. 1A Embodiment

Referring now to FIG. 1A, an embodiment of a system of this invention, generally SBC-7, is shown to include a cement plant CP, a heat exchange unit HEU, and a power plant PP. The cement plant CP produces two heat sources stream, a hot air stream S100 having parameters as at a point 603 and a flue gas stream S102 having parameters as at a point 600.

The hot air stream S100 having the parameters as at the point 603 passes through a first stage HES1 of the heat exchange unit HEU in counterflow with a fully condensed, multi-component working fluid stream S104 having parameters as at a point 100 in a first heat exchange process 603-605 or 100-101. The stream S104 having the parameters as at the point 100 is partially vaporized to form a partially vaporized working fluid stream S106 having parameters as at a point 101 and a cooled air stream S108 having parameters as at a point 605.

The flue gas stream S102 having the parameters as at the point 600 passes through a second stage HES2 of the heat exchange unit HEU in counterflow with the partially vaporized working fluid stream S106 having the parameters as at the point 101 in a second heat exchange process 600-601 or 101-102. The stream S106 having the parameters as at the point 101 is fully vaporized and superheated to form a fully vaporized, superheated working fluid stream S110 having parameters as at a point 102 and a cooled flue gas stream S112 having parameters as at a point 601.

The stream S110 having the parameters as at the point 102 is forwarded to an energy extraction unit EEU of the power plant PP, where a portion of thermal energy in the stream S108 having the parameters as at the point 102 is converted to a usable form of energy such as electrical energy forming a spent working fluid stream S114 having parameters as at a point 138. The stream S114 having the parameters as at the point 138 is forwarded to a condensation unit CU of the power plant PP, where it is fully condensed and optionally preheated to from the fully condensed stream S104 having the parameters as at the point 100.

FIG. 1B Embodiment

Figure 1B:
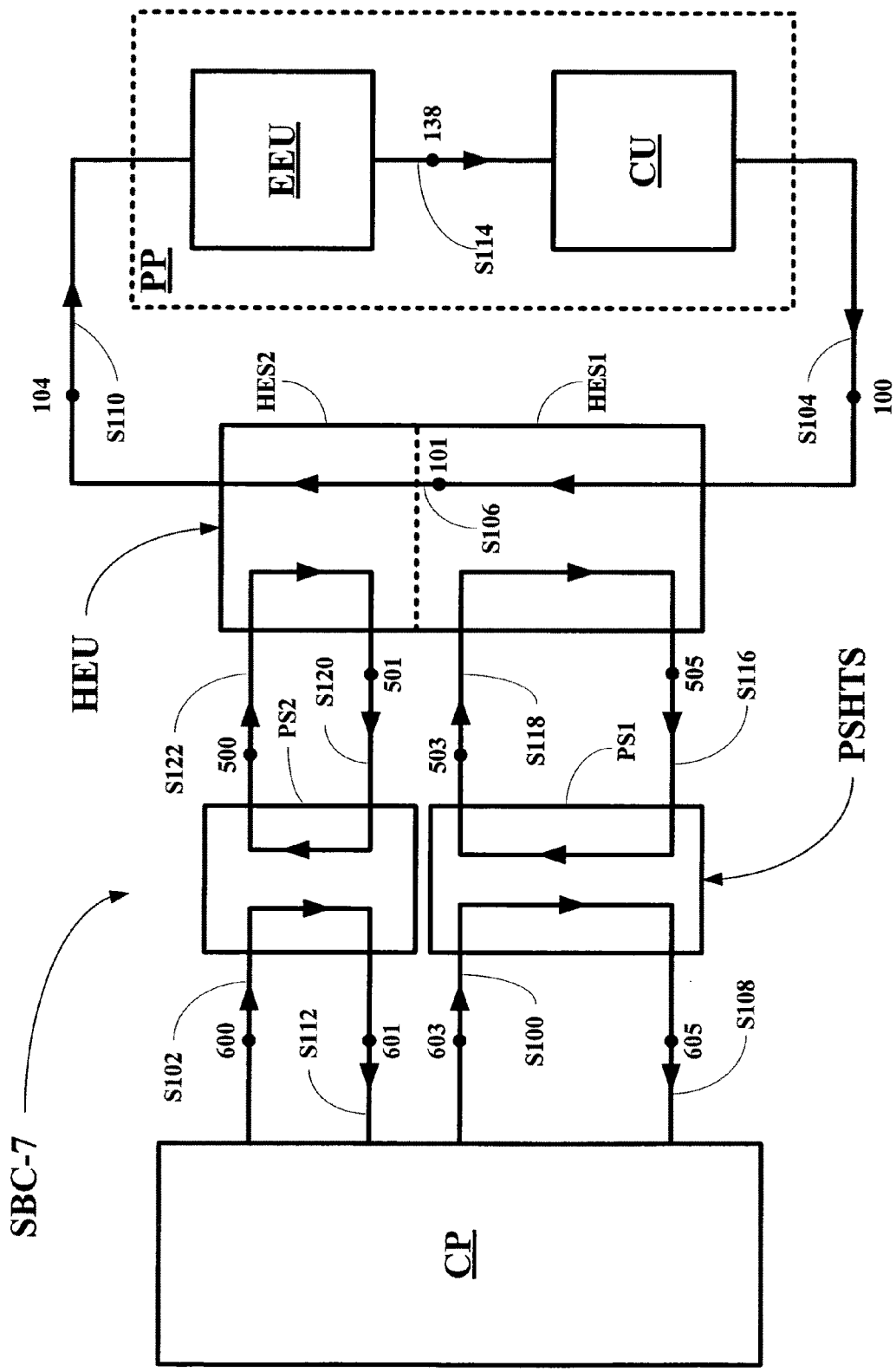
FIG. 1B depicts another embodiment of a system for extracting heat energy from a cement kiln that produces two heat source streams, a flue gas stream and a hot air stream, where the system includes a cement plant CP, a particulate separation and heat transfer subsystem PSHTS, a heat exchange unit HEU, and a power plant unit PP.

Referring now to FIG. 1B, another embodiment of a system of this invention, generally SBC-7, is shown to include a cement plant CP, a particulate separation and heat transfer system PSHTS, a heat exchange unit HEU, and a power plant PP. The cement plant CP produces two heat sources stream, a hot air stream S100 having parameters as at a point 603 and a flue gas stream S102 having parameters as at a point 600.

The hot air stream S100 having the parameters as at the point 603 passes through a first stage PS1 of the particulate separation and heat transfer system PSHTS in counterflow with a first high temperature heat transfer fluid stream S116 having parameters as at a point 503 in a first heat exchange process 603-605 or 505-503. The stream S116 having the parameters as at the point 505 is heated to form a heated first heat transfer fluid stream S118 having parameters as at a point 503 and a cooled air stream S108 having parameters as at a point 605.

The flue gas stream S102 having the parameters as at the point 600 passes through a second stage PS2 of the particulate separation and heat transfer system PSHTS in counterflow with a second high temperature heat transfer fluid stream S120 having parameters as at a point 501 in a second heat exchange process 600-601 or 501-500. The stream S120 having the parameters as at the point 501 is heated to form a heated second heat transfer fluid stream S122 having parameters as at a point 500 and a cooled flue gas stream S112 having parameters as at a point 601. The first and second heat transfer fluids can be the same or different.

The heated first heat transfer fluid stream S118 having the parameters as at the point 503 passes through a first stage HES1 of the heat exchange unit HEU in counterflow with a fully condensed, multi-component working fluid stream S104 having parameters as at a point 100 in a third heat exchange process 503-505 or 100-101. The stream S104 having the parameters as at the point 100 is partially vaporized to form a partially vaporized working fluid stream S106 having parameters as at a point 101 and the first heat transfer stream S116 having parameters as at a point 505.

The heated second heat transfer fluid stream S122 having the parameters as at the point 500 passes through a second stage HES2 of the heat exchange unit HEU in counterflow with the partially vaporized working fluid stream S106 having the parameters as at the point 101 in a second heat exchange process 500-501 or 101-102. The stream S106 having the parameters as at the point 101 is fully vaporized and superheated to form a fully vaporized, superheated working fluid stream S110 having parameters as at a point 102 and a second heat transfer stream S120 having parameters as at a point 601.

The stream S110 having the parameters as at the point 102 is forwarded to an energy extraction unit EEU of the power plant PP, where a portion of thermal energy in the stream S108 having the parameters as at the point 102 is converted to a usable form of energy such as electrical energy forming a spent working fluid stream S114 having parameters as at a point 138. The stream S114 having the parameters as at the point 138 is forwarded to a condensation unit CU of the power plant PP, where it is fully condensed and optionally preheated to from the fully condensed stream S104 having the parameters as at the point 100.

Efficiency Gain

The use of sequential heat exchange stages allows improved utilization of heat from the hot air S100 and from the flue gas stream S102, without the concern of having to bring the two streams to the same temperature. The utilization of sequential heat exchange steps provides higher efficiency. Computations show a thermal efficiency of 28.88%, which corresponds to a 2nd Law efficiency of 66.93%.

Because the heat exchanger steps of these embodiments of this system operate in sequence, a single working fluid stream can be sent through heat exchange steps, using the same tubes, with no need for the collection and redistribution of the working fluid between parallel oriented heat exchangers as is true in the prior art.

Heat Exchange Unit and Power Plant Embodiments

Figure 2A:
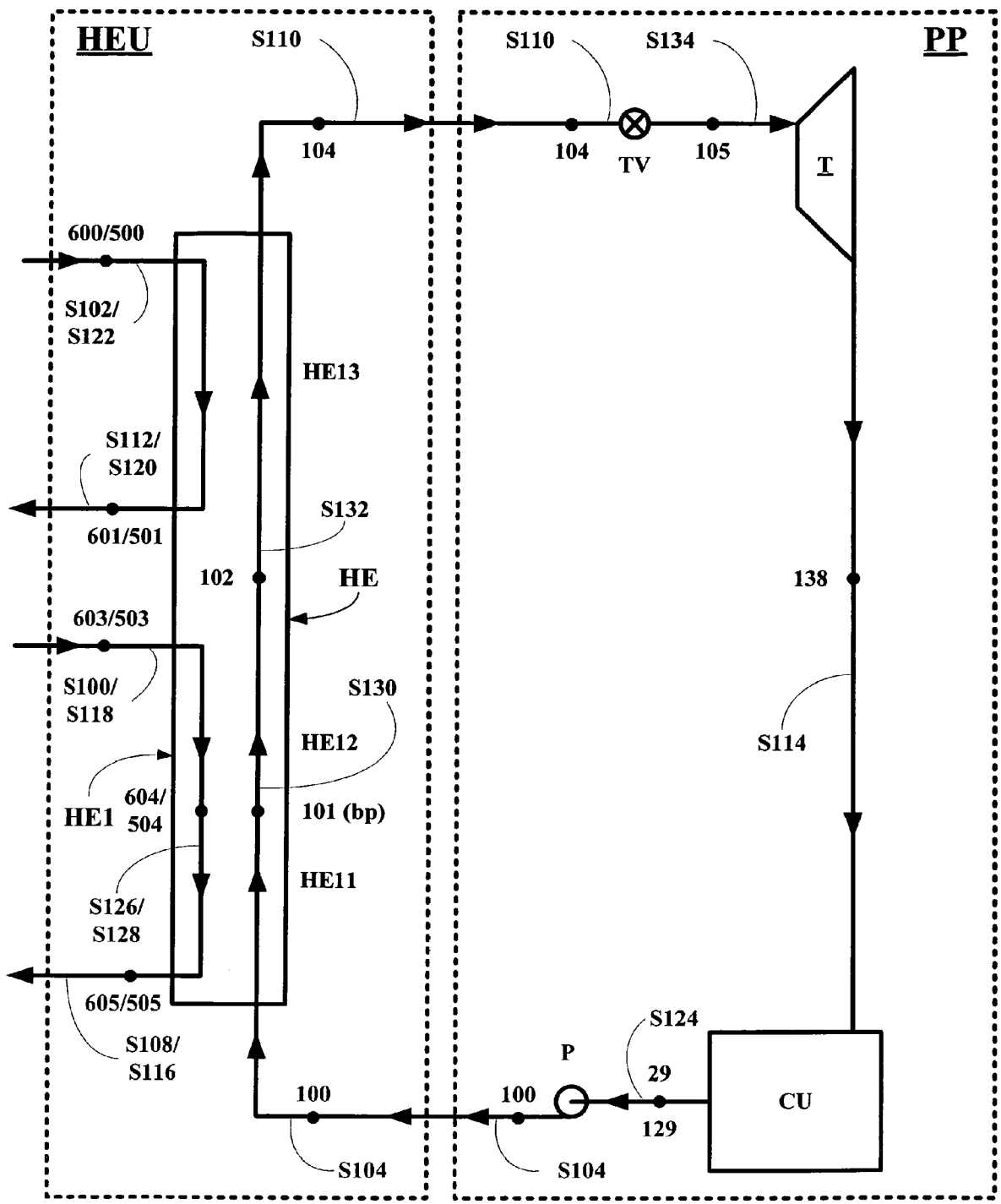
FIG. 2A depicts an embodiment of the heat exchange unit HEU and the power plant unit PP.

FIG. 2A HEU/PP Embodiment

Referring to FIG. 2A, another embodiment of the heat exchange unit HEU and power plant PP of this invention includes a multi-component working fluid stream S124 having parameters as at a point 29/129, corresponding to a state of sub-cooled liquid, enters into a feed pump P, where its pressure is increased to a desired higher pressure forming the fully condensed working fluid stream S104 having parameters as at a point 100.

Thereafter, the stream S104 having the parameters as at the point 100 is sent into a first state HE11 of a heat exchanger HE, where it is initially preheated in counterflow with a partially cooled hot air stream S126 having parameters as at a point 604 or a partially cooled first heat transfer fluid stream S128 having parameters as at a point 504 in a first heat exchange process 604-605/504-505 or 100-101, to form a preheated working fluid stream S130 having parameters as at a point 101, corresponding to a state of saturated liquid and a cooled hot air stream S108 having the parameters as at the point 605 or the first heat transfer fluid stream S116 having the parameters as at the point 505. Thereafter, the stream S130 having the parameters as at the point 101 is sent into a second stage HE12 of the heat exchanger HE, where it is heated and partially vaporized in counterflow with the hot air stream S100 having the parameters as at the point 603 or the heated first heat transfer fluid stream S118 having the parameters as at the point 503 in a second heat exchange process 603-604/503-504 or 101-102, forming a partially vaporized working fluid stream S132 having parameters as at a point 102, corresponding to a state of liquid-vapor mixture and the partially cooled hot air stream S126 having the parameters as at the point 604 or the partially cooled first heat transfer fluid stream S128 having parameters as at a point 504. The cooled air stream S108 having the parameters as at the point 605 can be forwarded back to the cement plant CP to preheat cement components and/or input air. Of course, the first heat transfer fluid stream S116 is sent back to the PSHTS in a closed loop.

Thereafter, the stream S132 having the parameters as at the point 102 is sent into a third stage HE13 of the heat exchanger HE, where it is fully vaporized and superheated in counterflow with a flue gas stream S102 having parameters as at a point 600 or the heated second heat transfer fluid stream S122 having parameters as at the point 500 in a third heat exchange process 600-601/500-501 or 102-104, forming the fully vaporized and superheated stream S104 having the parameters as at the point 104 and the cooled flue gas stream S112 having the parameters as at the point 601 or the second heat transfer fluid stream S120 having the parameters as at the point 501. The cooled flue gas stream S112 having the parameters as at the point 601 can be forwarded back to the cement plant to preheat cement components and/or input air. Of course, the second heat transfer fluid stream S120 is sent back to the PSHTS in a closed loop.

The stream S110 having the parameters as at the point 104 is then sent into an admission valve TV, where its pressure is slightly reduced, forming a reduced pressure, fully vaporized, superheated stream S134 having parameters as at a point 105.

The stream S134 having the parameters as at the point 105 is then sent into a turbine T, where it is expanded and a portion of its thermal energy is converted into a usable form of energy such as electric power, forming the spent working fluid stream S114 having the parameters as at the point 138.

The spent working fluid stream S114 having the parameters as at the point 138 is then sent into a condensation unit CU. The condensation unit CU can be a simple condenser and a pump, a distillation-condensation subsystem DCSS as set forth U.S. Pat. No. 6,968,690, a condensation thermal compression subsystem CTCSS as described in U.S. Pat. No. 7,043,919 (incorporate as per the final paragraph of the specification) or any other subsystem capable of condensing a multi-component fluid. The stream S114 having the parameters as at the point 138 is then fully condensed, forming the stream S124 having the parameters as at the point 29 as it leaves the condensation unit CU. In certain embodiments, the fully condensed working fluid stream S124 having the parameters as at the point 29 is preheated in the condensation unit CU. At the moment that stream S124 having the parameters as at the point 29 leaves the CU it is re-designated as having parameters as at the point 129 (see above.)

The cycle is closed.

Figure 2B:
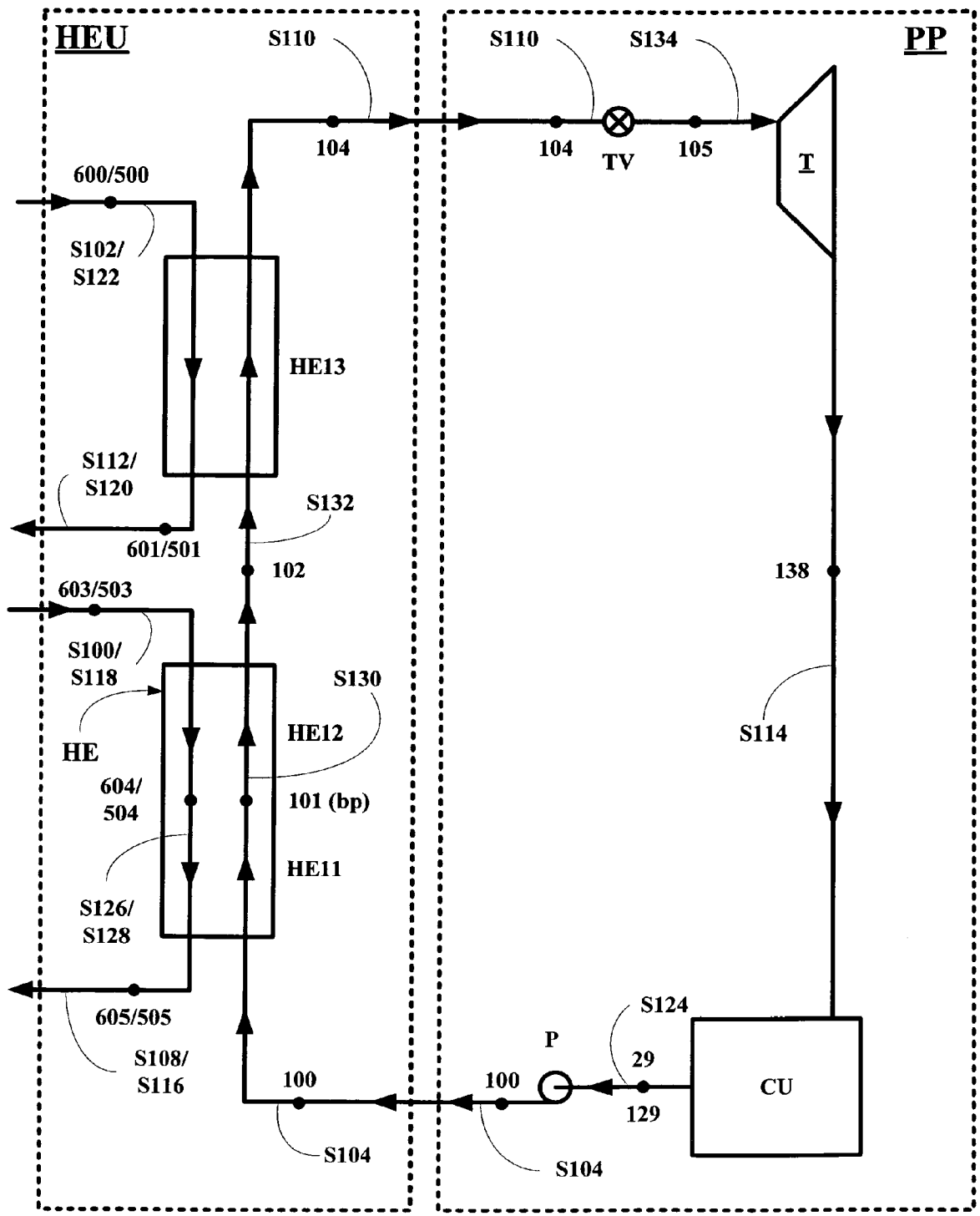
FIG. 2B depicts another embodiment of the heat exchange unit HEU and the power plant unit PP.

FIG. 2B HEU/PP Embodiment

Referring to FIG. 2B, another embodiment of the heat exchange unit HEU and power plant PP of this invention includes the multi-component working fluid stream S124 having the parameters as at the point 29/129, corresponding to a state of sub-cooled liquid, enters into a feed pump P, where its pressure is increased to a desired higher pressure forming the fully condensed working fluid stream S104 having parameters as at a point 100.

Thereafter, the stream S104 having the parameters as at the point 100 is sent into a first stage HE11 of a first heat exchanger HE, where it is initially preheated in counterflow with the partially cooled hot air stream S126 having parameters as at a point 604 or a partially cooled first heat transfer fluid stream S128 having parameters as at a point 504 in a first heat exchange process 604-605/504-505 or 100-101, to form the preheated working fluid stream S130 having the parameters as at the point 101, corresponding to a state of saturated liquid and a cooled hot air stream S108 having the parameters as at the point 605 or the first heat transfer fluid stream S116 having the parameters as at the point 505. Thereafter, the stream S130 having the parameters as at the point 101 is sent into a second stage HE12 of the first heat exchanger HE, where it is heated and partially vaporized in counterflow with the hot air stream S100 having the parameters as at the point 603 or the heated first heat transfer fluid stream S118 having the parameters as at the point 503 in a second heat exchange process 603-604/503-504 or 101-102, forming the partially vaporized working fluid stream S132 having parameters as at the point 102, corresponding to a state of liquid-vapor mixture and the partially cooled hot air stream S126 having the parameters as at the point 604 or the partially cooled first heat transfer fluid stream S128 having parameters as at the point 504. The cooled air stream S108 having the parameters as at the point 605 can be forwarded back to the cement plant to preheat cement components and/or input air. Of course, the first heat transfer fluid stream S116 is sent back to the PSHTS in a closed loop.

Thereafter, the stream S132 having the parameters as at the point 102 is sent into a second heat exchanger HE13, where it is fully vaporized and superheated in counterflow with the flue gas stream S102 having the parameters as at the point 600 or the heated second heat transfer fluid stream S122 having the parameters as at the point 500 in a third heat exchange process 600-601/500-501 or 102-104, forming the fully vaporized and superheated stream S110 having the parameters as at the point 104 and the cooled flue gas stream S112 having the parameters as at the point 601 or the second heat transfer fluid stream S122 having the parameters as at the point 501. The cooled flue gas stream S112 having the parameters as at the point 601 can be forwarded back to the cement plant to preheat cement components and/or input air. Of course, the second heat transfer fluid stream S120 is sent back to the PSHTS in a closed loop.

The stream S110 having the parameters as at the point 104 is then sent into an admission valve TV, where its pressure is slightly reduced, forming a reduced pressure, fully vaporized, superheated stream S134 having the parameters as at the point 105.

The stream S134 having the parameters as at the point 105 is then sent into a turbine T, where it is expanded and a portion of its thermal energy is converted into a usable form of energy such as electric power, forming a spent working fluid stream S114 having parameters as at a point 138.

The spent working fluid stream S114 having the parameters as at the point 138 is then sent into a condensation unit CU. The condensation unit CU can be a simple condenser and a pump, a distillation-condensation subsystem DCSS as set forth U.S. Pat. No. 6,968,690, a condensation thermal compression subsystem CTCSS as described in U.S. Pat. No. 7,043,919 (incorporate as per the final paragraph of the specification) or any other subsystem capable of condensing a multi-component fluid. The stream S114 having the parameters as at the point 138 is then fully condensed, forming the stream S124 having the parameters as at the point 29 as it leaves the condensation unit CU. In certain embodiments, the fully condensed working fluid stream S124 having the parameters as at the point 29 is preheated in the condensation unit CU. At the moment that stream S124 having the parameters as at the point 29 leaves the CU it is re-designated as having parameters as at the point 129 (see above.)

The cycle is closed.

Figure 2C:
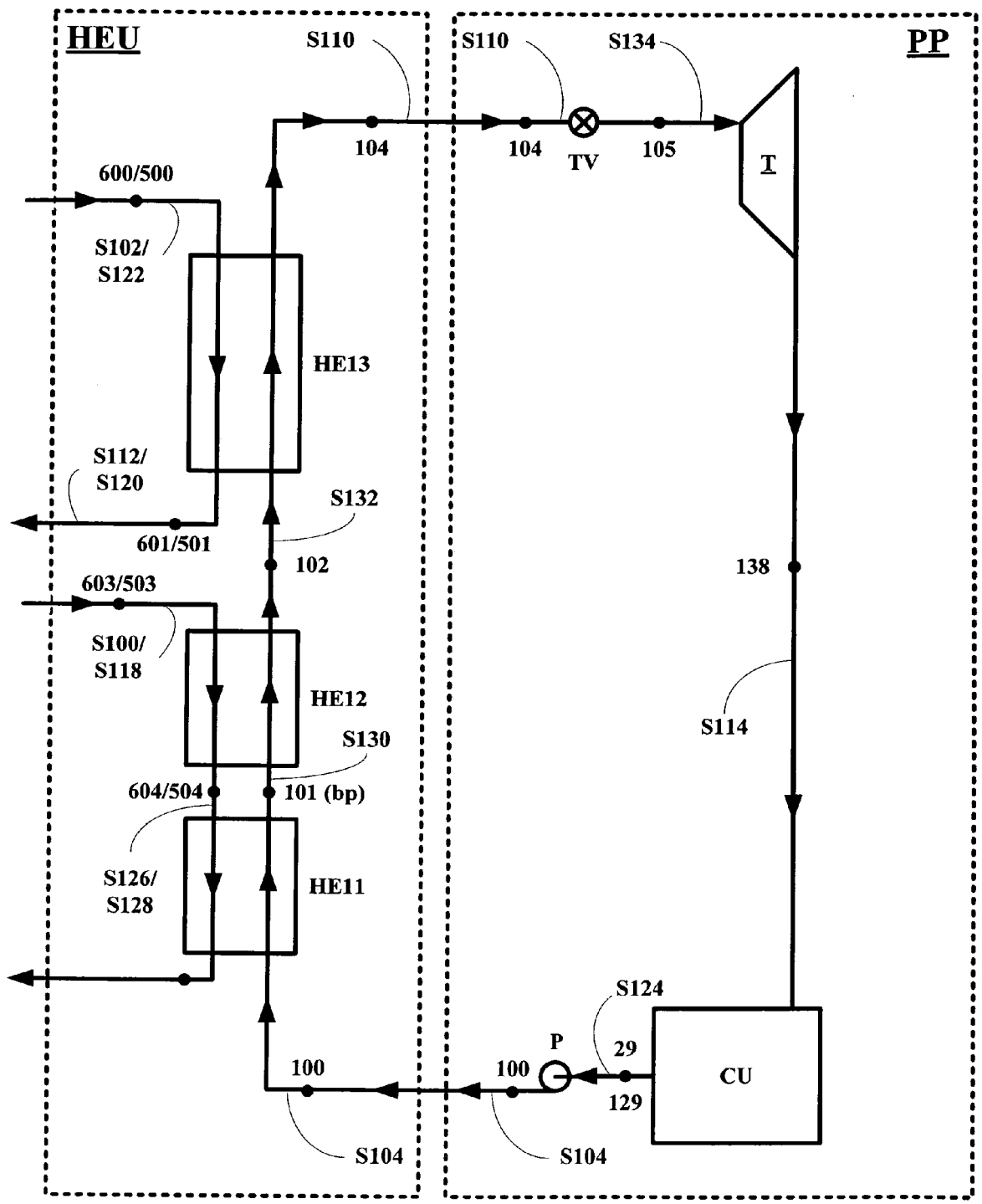
FIG. 2C depicts another embodiment of the heat exchange unit HEU and the power plant unit PP.

FIG. 2C HEU/PP Embodiment

Referring now to FIG. 2C, the heat exchanger HE of FIG. 2B is divided into two separate heat exchangers HE11 and HE12. Everything otherwise is the same.

Particulate Separation and Heat Transfer SubSystems

Both heat source streams usually carry a substantial amount of cement dust which can cause substantial erosion of the surface of the heat exchangers. To deal with this problem, we can incorporate a subsystem previously described in co-pending U.S. patent application Ser. No. 12/246,360, filed Oct. 6, 2008 (incorporate as per the final paragraph of the specification) in which heat from one or both primary heat source streams are transferred to a high temperature heat transfer fluid in a particulate separation and heat transfer subsystem PSHTS, which are cleaned and then then used as a heat source streams in the sequential heat exchange unit HEU of this invention see FIGS. 3A-D. Thus, the system described above can also be operated with the separate high temperature heat transfer fluid stream acting in place of the hot air stream and/or the flue gas stream.

Calculations have shown that the use of the high temperature heat transfer fluid in this manner has no impact on the performance and efficiency of the system of this invention.

The embodiments of the particulate separation and heat transfer subsystem PSHTS of this invention is shown in FIG. 3A-D all include a centripetal separator (a so called "cyclone" separator) C, a scrubber S, a recirculating pump RP for circulated a high temperature heat transfer fluid, and a filter F.

The centripetal separator C removed large particulate material form the hot gas stream or the flue gas stream from the cement plant CP; while the filter F removes dust from the heat transfer fluid circulated by the recirculating pump RP. The system of this invention include to particulate separation and heat transfer subsystems, one for the hot air stream S100 and a separate one for the flue gas stream S102. However, the two subsystems are substantially identical, therefore, the two will be set for using the two streams in an or context in the detailed embodiments below. The large particle separator C is designed to remove substantially all large particles from either the hot air stream or the flue gas stream, while the filter F is designed to remove substantially all of the dust or small particles from the hot gas stream, the flue gas stream, or the high temperature heat transfer fluid streams, depending on the embodiment employed. The terms substantially means that the stream contains 10% or less large particles in the case of the large particle separator C or 10% or less small particles in the case of the filter F. In certain embodiments, the terms substantially means that the stream contains 5% or less large particles in the case of the large particle separator C or 5% or less small particles in the case of the filter F. In certain embodiments, the terms substantially means that the stream contains 1% or less large particles in the case of the large particle separator C or 1% or less small particles in the case of the filter F.

Figure 3A:
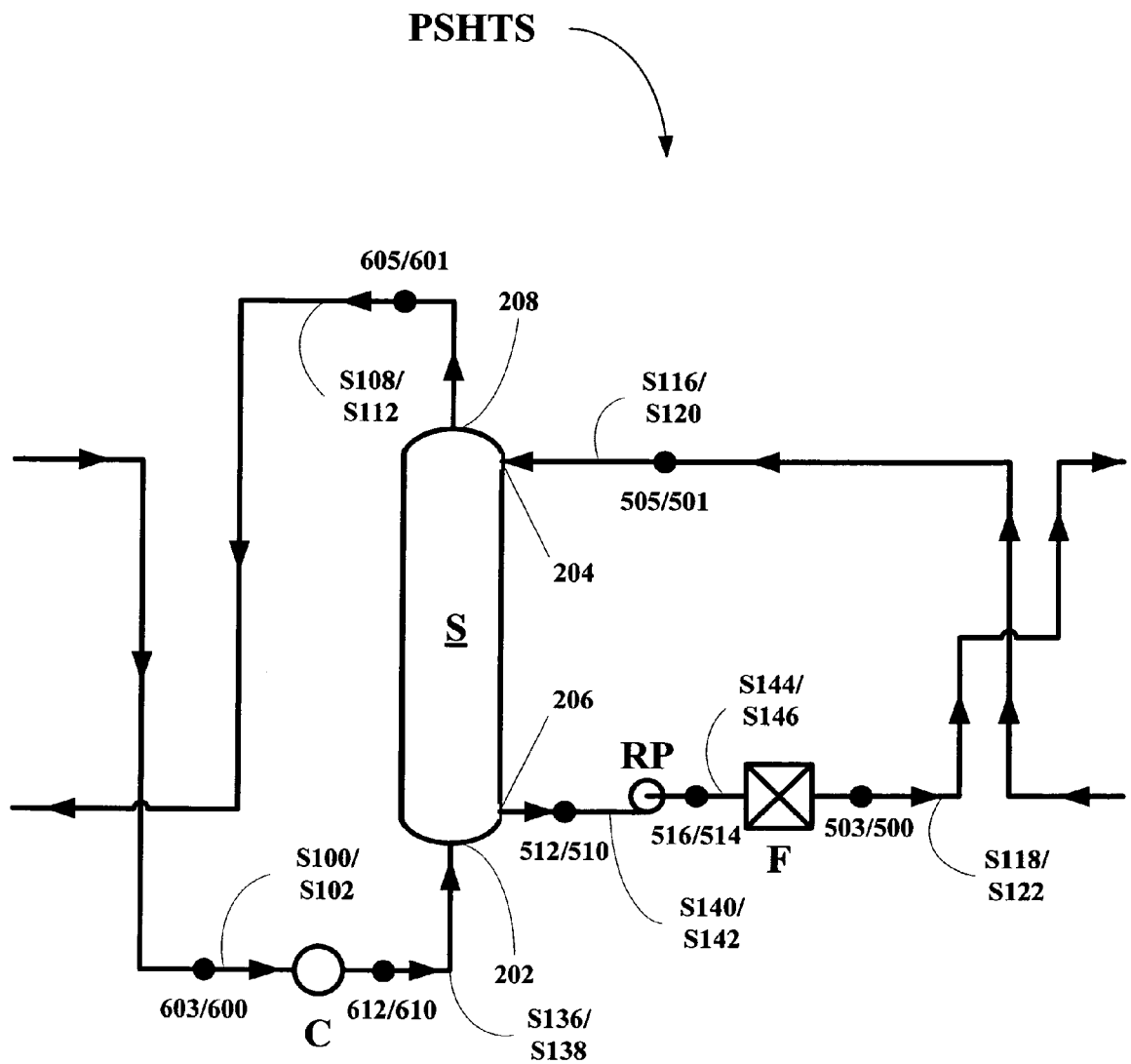
FIG. 3A depicts an embodiment of the particulate separation and heat transfer subsystem PSHTS.

FIG. 3A PSHTS Embodiment

Referring now to FIG. 3A, the hot air stream S100 having parameters as at a point 603 or the flue gas stream S102 having the parameters as at the point 600 from the cement plant CP passes through the cyclone separator C, where large particles of dust are separated from the hot air stream S100 having the parameters as at the point 603 or the flue gas stream S102 having the parameters as at the point 600 by centripetal forces to form a partially cleaned hot air stream S136 having parameters as at a point 612 or a partially cleaned flue gas stream S138 having parameters as at a point 610. One experienced in the art can easily select a proper type and design of the cyclone separator C for this purpose.

Thereafter, the partially cleaned hot air stream S136 having the parameters as at the point 612 or the partially cleaned flue gas stream S138 having parameters as at a point 610, still carrying a substantial quantity of dust, is sent into a bottom port 202 of the scrubber S. Simultaneously, the first high temperature heat transfer fluid stream S116 having the parameters as at the point 505 or the second high temperature heat transfer fluid stream S120 having the parameters as at the point 501 is forwarded to an upper side port 204 of the scrubber S. The high temperature heat transfer fluid comprises any high temperature heat transfer fluid known in the art as set forth above.

The partially cleaned hot air stream S136 having the parameters as at the point 612 or the partially cleaned flue gas stream S138 having parameters as at a point 610 is cooled in the scrubber S to form the cooled air stream S108 having the parameters as at the point 605 of the cooled air stream S112 having the parameters as at the point 601 and the first high temperature heat transfer fluid stream S116 having the parameters as at the point 505 or the second high temperature heat transfer fluid stream S120 having the parameters as at the point 501 is heated to form a heated dust laden first high temperature heat transfer fluid stream S140 having parameters as at a point 512 or a heated dust laden second high temperature heat transfer fluid stream S142 having parameters as at a point 510.

Thereafter, the heated dust laden first high temperature heat transfer fluid stream S140 having parameters as at a point 512 or a heated dust laden second high temperature heat transfer fluid stream S142 having parameters as at a point 510, which has been heated by the stream S136 having the parameters as at the point 612 or the stream S138 having the parameters as at the point 610, and now carries the dust that was brought into the scrubber S by those streams, leaves the scrubber S via a lower side port 206. Meanwhile, the cooled air stream S108 having the parameters as at the point 605 or the cooled air stream S112 having the parameters as at the point 601 leaves the scrubber S via a top port 208.

Thereafter, the heated dust laden first high temperature heat transfer fluid stream S140 having parameters as at a point 512 or a heated dust laden second high temperature heat transfer fluid stream S142 having parameters as at a point 510 enters into the recirculating pump RP, where its pressure is increased to form a high pressure, heated dust laden first high temperature heat transfer fluid stream S144 having parameters as at a point 516 or a high pressure, heated dust laden second high temperature heat transfer fluid stream S146 having parameters as at a point 514. Thereafter, the high pressure, heated dust laden first high temperature heat transfer fluid stream S144 having parameters as at a point 516 or the high pressure, heated dust laden second high temperature heat transfer fluid stream S148 having parameters as at a point 514 passes through a filter F, where the dust is separated from the fluid to form the heated first high temperature heat transfer fluid stream S118 having the parameters as at the point 503 or the heated second high temperature heat transfer fluid stream S122 having the parameters as at the point 500, which is substantially dust free. While any filter capable of separating the dust from the fluid can be used, the most suitable filters for this purpose are knitted mesh filters which can operated at very high temperatures as is well known in the art.

Figure 3B:
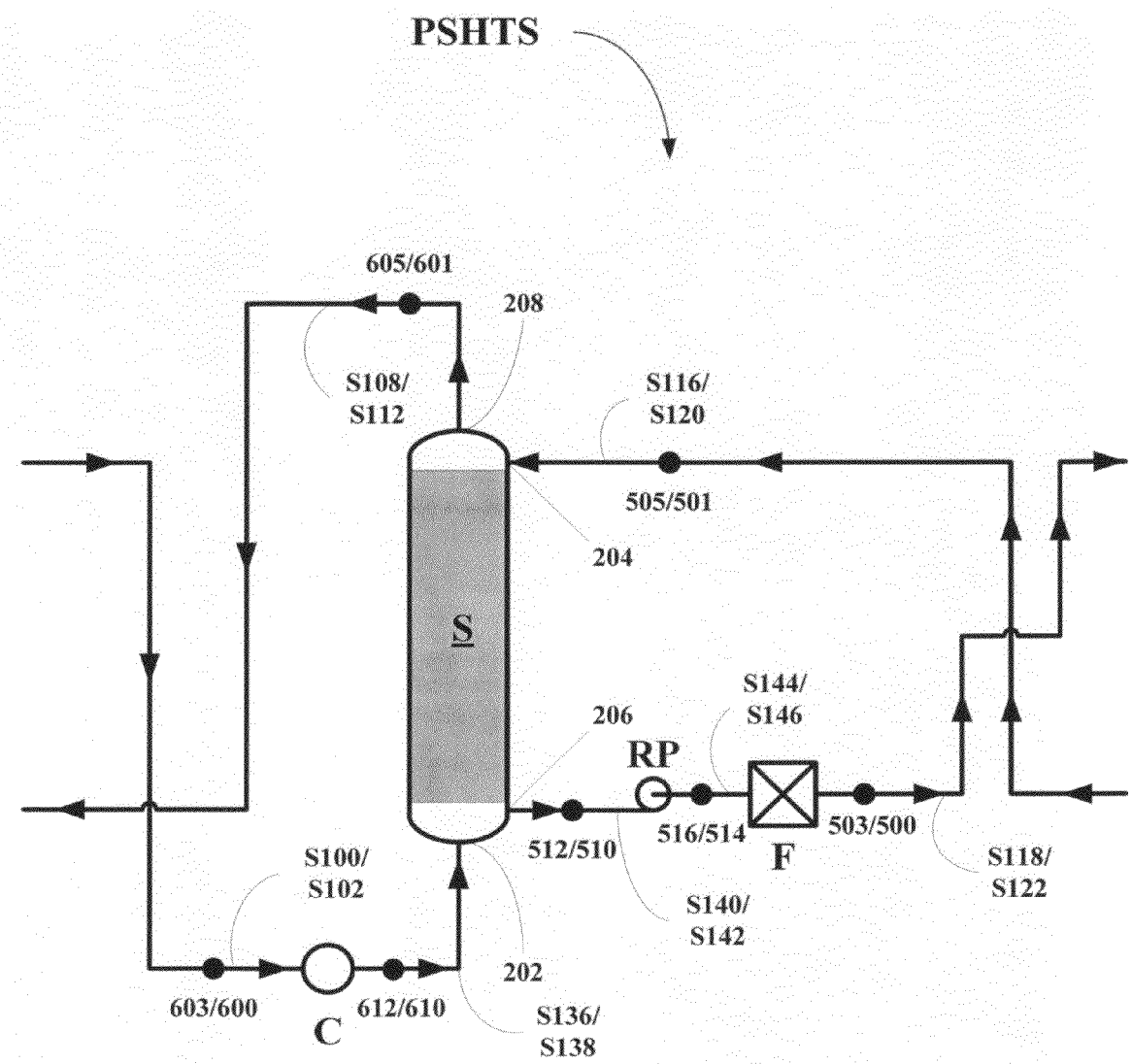
FIG. 3B depicts another embodiment of the particulate separation and heat transfer subsystem PSHTS.

FIG. 3B PSHTS Embodiment

Referring now to FIG. 3B, an alternate embodiment of the embodiment of FIG. 3A is shown, where the scrubber S includes a packing 300 described hereinafter. All other features of FIG. 3B are identical in FIG. 3A and the reader is referred to the description associated with FIG. 3A.

Figure 3C:
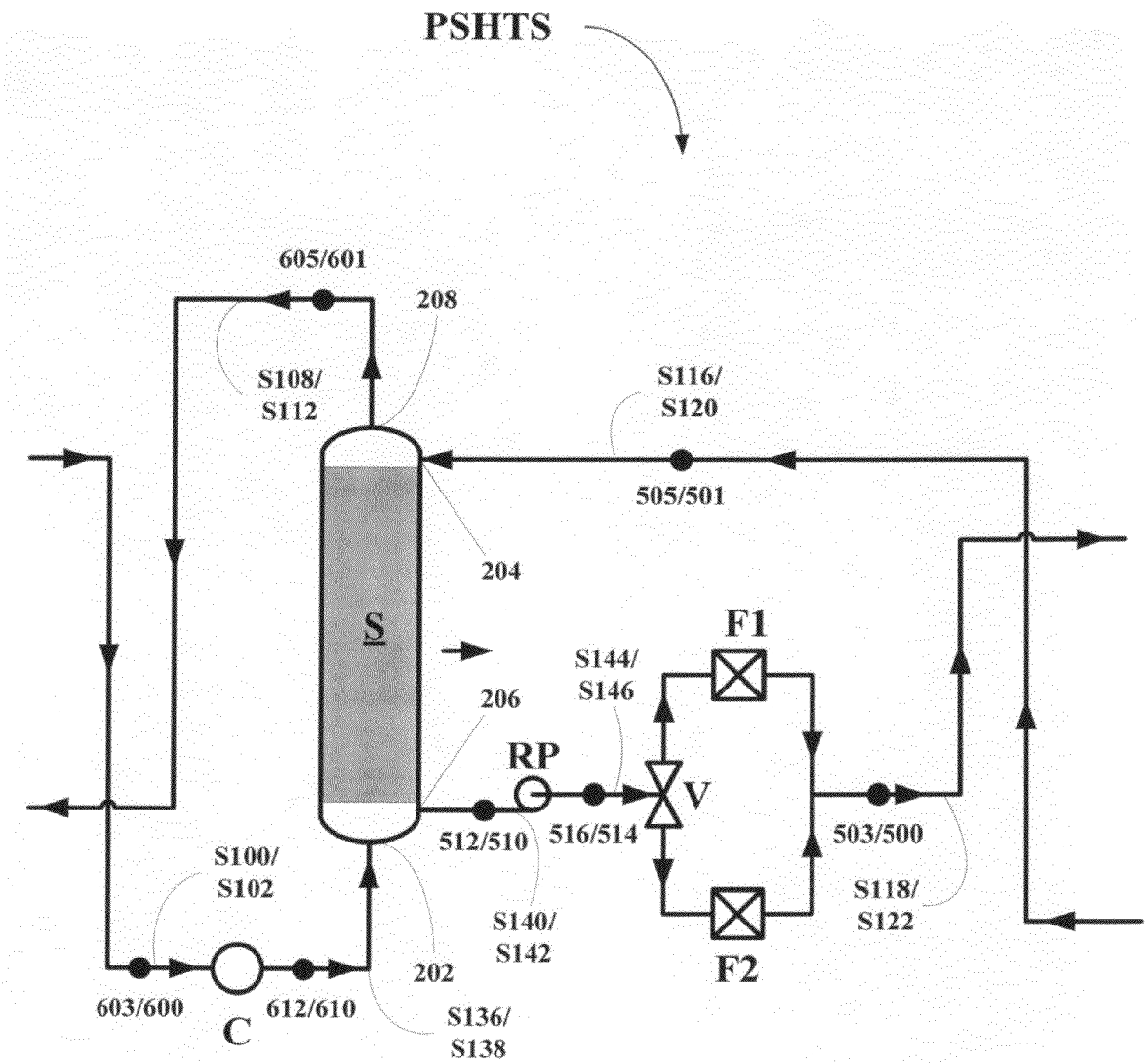
FIG. 3C depicts another embodiment of the particulate separation and heat transfer subsystem PSHTS.

FIG. 3C PSHTS Embodiment

Referring now to FIG. 3C, another embodiment of the particulate separation and heat transfer subsystem PSHTS is shown to include a plurality of filters Fn, here two F1 and F2 and a control valve V. The two filters F1 and F2 are installed in parallel so that one of the filters F1 and F2 is in operation, while the other is standing by. When one filter becomes overly filled by dust, operation switches to the other filter, while the overly filled filter is cleaned and then returned to use when the second filter is overly filled. The same procedure can be used with additional filters.

Figure 3D:
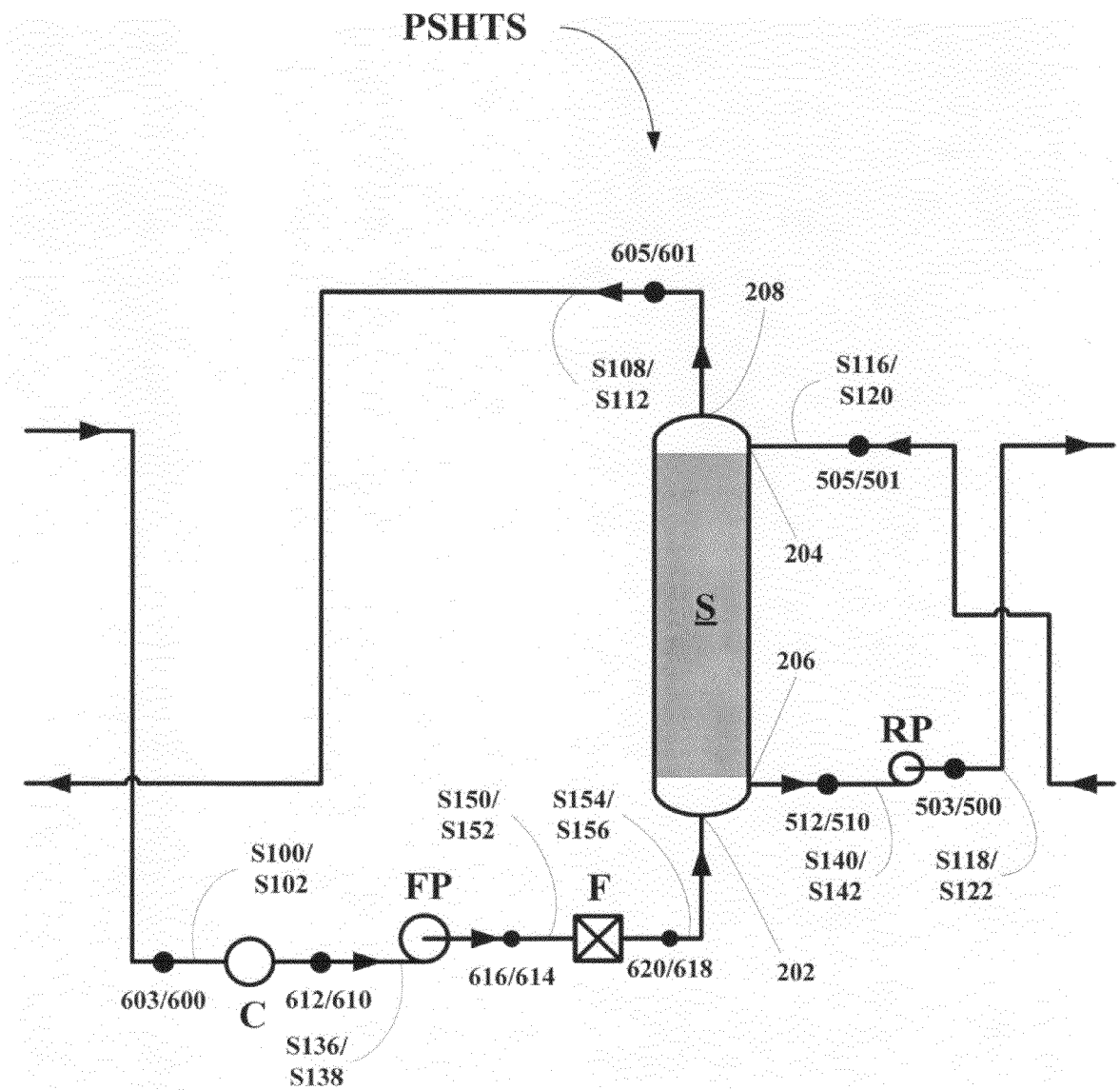
FIG. 3D depicts another embodiment of the particulate separation and heat transfer subsystem PSHTS.

FIG. 3D PSHTS Embodiment

Referring now to FIG. 3D, another embodiment of the particulate separation and heat transfer subsystem PSHTS is shown to include a relocation of the filter F and a compressor or feed pump FP, which raises a pressure of the partially cleaned hot air stream S136 having the parameters as at the point 612 or the partially cleaned flue gas stream S138 having parameters as at a point 610 to form a high pressure dust laden air stream S150 having parameters as at a point 616 or a high pressures dust laden flue gas stream S152 having parameters as at a point 614. The stream S150 having the parameters as at the point 616 or the stream S152 having the parameters as at the point 614 is passed through the filter F to form a substantially dust-free high pressure air stream S154 having parameters as at a point 620 or a substantially dust-free high pressure flue gas stream S156 having parameters as at a point 618. The substantially dust-free high pressure air stream S154 having the parameters as at the point 620 or the substantially dust-free high pressure flue gas stream S156 having the parameters as at the point 618 then transfer heat to the first high temperature heat transfer fluid stream S116 having the parameters as at the point 505 or the second high temperature heat transfer fluid stream S120 having the parameters as at the point 501 to produce the heated first high temperature heat transfer fluid stream S118 having the parameters as at the point 503 or the second high temperature heat transfer fluid stream S122 having the parameters as at the point 500. which may be circulated by the recirculating pump RP. However, such a compressor would use a great deal of power and would be subject to heavy erosion from the entrained dust. As in FIG. 3C, this embodiment can include a plurality of filters Fn with valves so that one can be in use, while the other on stand by or being cleaned.

The systems of this invention not only prevents erosion of heat transfer equipment due to dust, but also provides a substantial increase in the efficiency of heat transfer from the heat source to the power cycle. Heat transfer in the scrubber S, which is in essence a direct contact heat exchanger, is extremely efficient. Heat transfer in the heat exchange unit HEU, because it is performed by a fluid of much higher density than gas, is also many times more efficient than would be the case if the heat transfer was performed directly from the heat source gas to the working fluid of the power cycle.

An additional advantage of such a system is the ability to operate without interruptions to clean the surfaces of heat transfer apparatus from dust, which in turn provides for a high availability and reliability of the proposed system.

Packing

Figure 4:
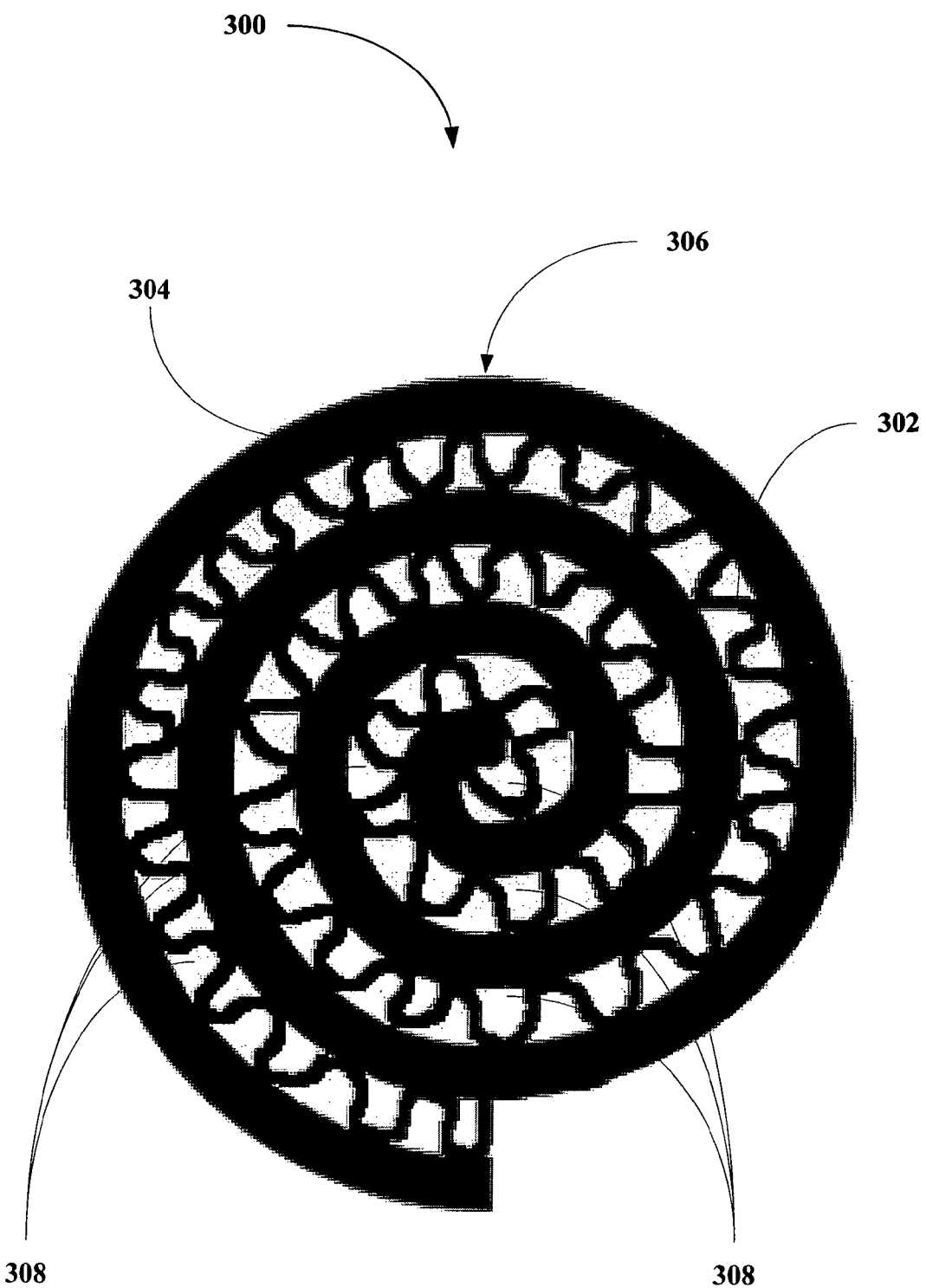
FIG. 4 depicts an embodiment of the packing of FIGS. 3B-D.

Referring now to FIG. 4, one embodiment of the scrubber S includes the packing 300 comprising a sheet of corrugated material 302 (metal or other suitable high temperature material) layered with a sheet of non corrugated material 304, and then formed into a roll 306. However other types of scrubbers can be used as well, including scrubbers with combinations of different sorts of packing.

Such a packing 306 forms multiple vertical channels 308 through which the heat transfer fluid flows down as a film on surfaces of these vertical channels 308. At the same time, the dust laden gas flows up a center of these vertical channels 308.

In such a scrubber S including the packing 306, the partially cleaned hot air stream S136 having the parameters as at the point 612 or the dust free hot air stream S154 having the parameters as at the 620 or the partially cleaned flue gas stream S138 having the parameters as at the point 610 or the dust free flue gas stream S156 having the parameters as at the 618 is cooled to form the cooled air stream S108 having the parameters as at the point 605 or the cooled flue gas stream S112 having the parameters as at the point 601 and the first high temperature heat transfer fluid Si 16 having the parameters as at the point 505 or the second high temperature heat transfer fluid S120 having the parameters as at the point 501 is heated to form the heated first high temperature transfer fluid stream S118 having the parameters as at the point 503 or the heated second high temperature transfer fluid stream S122 having the parameters as at the point 500. Particles of dust cannot contact the surface of the packing material 306 directly, but rather contact the surface of a film of down-flowing heat transfer fluid. Because a density of the liquid is many times higher than the density of the gas, the particles of dust that penetrate through the down-flowing film of liquid lose their kinetic energy and thus cannot cause damaging erosion of the packing material 306 of the scrubber S. In general, one experienced in the art can choose and/or design an appropriate type of scrubber S for this purpose.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A power extraction system comprising:
    a cement plant producing a hot air stream and a flue gas stream;
    a particulate separation and heat transfer subsystem including:
        a hot air particulate separation and heat transfer unit adapted to heat a first high temperature heat transfer fluid stream with the air stream to form a heated first high temperature heat transfer fluid stream and a cooled air stream,
    a heat exchange apparatus including:
        a first heat exchange stage adapted to heat a fully condensed, multi-component working fluid stream in counterflow with the first high temperature heat transfer fluid stream to form a partially vaporized, multi-component working fluid stream comprising at least one lower boiling point component and at least one higher boiling point component and a cooled first high temperature heat transfer fluid stream; and
        a second heat exchange stage adapted to heat the partially vaporized, multi-component working fluid stream in counterflow with a second heat source stream to form a fully vaporized and superheated, working fluid stream and a cooled second heat source stream;
    a power plant including:
        an energy extraction unit adapted to convert a portion of thermal energy in the fully vaporized and superheated, working fluid stream into a usable form of energy and to form a spent, multi-component working fluid stream; and
        a condensation unit adapted to condense the spent, multi-component working fluid stream thermal to form the fully condensed, multi-component working fluid stream.

2. The system of claim 1, wherein the cooled hot gas stream is returned to the cement plant to preheat materials for use in the cement plant and/or the second heat source stream is the flue stream and the cooled flue gas stream is returned to the cement plant to preheat materials for use in the cement plant.

3. The system of claim 1, wherein the condensation unit preheats the fully condensed working fluid stream.

4. The system of claim 1, wherein the condensation unit comprises a simple condenser, a distillation-condensation subsystem DCSS or a condensation thermal compression subsystem CTCSS that preheats the fully condensed, multi-component working fluid stream.

5. The system of claim 1, wherein each particulate separation and heat transfer unit comprises:
    a large particle separator adapted to remove substantially all large particles from either the hot air stream or the flue gas stream,
    a scrubber adapted to heat the heat transfer fluid streams with heat from the hot air stream or the flue gas,
    a pump adapted to circulated the heated heat transfer fluid streams into the heat exchange unit, and
    a filter for removing the dust from the transfer fluid streams or the hot air streams or the flue gas stream so that the streams going to the heat exchange unit are substantially dust free.

6. The system of claim 1, wherein the
    a particulate separation and heat transfer subsystem further includes:
        a flue gas particulate separation and heat transfer unit adapted to heat a second high temperature heat transfer fluid stream with the flue gas stream to form a heated second high temperature heat transfer fluid stream and the cooled flue gas stream,
    where the second heat source stream is the heated second high temperature heat transfer fluid stream.

7. The system of claim 6, wherein each particulate separation and heat transfer unit comprises:
    a large particle separator adapted to remove substantially all large particles from either the hot air stream or the flue gas stream,
    a scrubber adapted to heat the heat transfer fluid streams with heat from the hot air stream or the flue gas,
    a pump adapted to circulated the heated heat transfer fluid streams into the heat exchange unit, and
    a filter for removing the dust from the transfer fluid streams or the hot air streams or the flue gas stream so that the streams going to the heat exchange unit are substantially dust free.

8. A method for producing usable energy from heat sources stream derived from a cement plant comprising:
    supplying a hot air stream and a flue gas stream from a cement plant,
    passing the hot air stream through a large particle separator of a particulate separation and heat transfer subsystem to form a dust laden hot air stream,
    transferring heat from the dust laden hot air stream to a first high temperature heat transfer fluid stream in a scrubber to form the cooled air stream and a heated first high temperature heat transfer fluid stream,
    pressurizing the heated first high temperature heat transfer fluid stream to form a higher pressure, heated first high temperature heat transfer fluid stream, and
    filtering the higher pressure, heated first high temperature heat transfer fluid stream to form a substantially dust free, higher pressure, heated first high temperature heat transfer fluid stream, which is used to partially vaporize the fully condensed, multi-component working fluid stream in the first stage of the heat exchange unit,
    heating a fully condensed, multi-component working fluid stream comprising at least one lower boiling point component and at least one higher boiling point component with heat derived directly or indirectly from the hot air stream in a first stage of a heat exchange unit to form a partially vaporized, multi-component working fluid stream and a cooled air stream,
    heating the partially vaporized, multi-component working fluid stream with heat derived directly or indirectly from the flue gas stream in a second stage of the heat exchange unit to form a fully vaporized and superheated, multi-component working fluid stream and a cooled flue gas stream, converting a portion of thermal energy in the fully vaporized and superheated, multi-component working fluid stream to a usable form of energy to form a spent, multi-component working fluid stream, and condensing the spent, multi-component working fluid stream to form the fully condensed, multi-component working fluid stream.

9. The method of claim 8, further comprising:

returning the cooled air stream to the cement plant, and/or returning the cooled flue gas stream to the cement plant.

10. The method of claim 8, further comprising:

passing the flue gas stream through a large particle separator of a particulate separation and heat transfer subsystem to form a dust laden flue gas stream, transferring heat from the dust laden flue gas stream to a second high temperature heat transfer fluid stream in a scrubber to form the cooled flue gas stream and a heated second high temperature heat transfer fluid stream, pressurizing the heated second high temperature heat transfer fluid stream to form a higher pressure, heated second high temperature heat transfer fluid stream, and filtering the higher pressure, heated second high temperature heat transfer fluid stream to form a substantially dust free, higher pressure, heated second high temperature heat transfer fluid stream, which is used to fully vaporize and superheat the partially vaporized, multi-component working fluid stream in the second stage of the heat exchange unit.

11. A method for producing usable energy from heat sources stream derived from a cement plant comprising:

supplying a hot air stream and a flue gas stream from a cement plant, passing the hot air stream through a large particle separator of a particulate separation and heat transfer subsystem to form a dust laden hot air stream, pressurizing the dust laden hot air stream to form a higher pressure, dust laden hot air stream, filtering the higher pressure, dust laden hot air stream to form a substantially dust free, higher pressure, hot air stream, and transferring heat from the substantially dust free, higher pressure, hot air stream to a first high temperature heat transfer fluid stream in a scrubber to form the cooled air stream and a heated first high temperature heat transfer fluid stream, which is used to partially vaporize the fully condensed, multi-component working fluid stream in the first stage of the heat exchange unit, heating a fully condensed, multi-component working fluid stream comprising at least one lower boiling point component and at least one higher boiling point component with heat derived directly or indirectly from the hot air stream in a first stage of a heat exchange unit to form a partially vaporized, multi-component working fluid stream and a cooled air stream, heating the partially vaporized, multi-component working fluid stream with heat derived directly or indirectly from the flue gas stream in a second stage of the heat exchange unit to form a fully vaporized and superheated, multi-component working fluid stream and a cooled flue gas stream, converting a portion of thermal energy in the fully vaporized and superheated, multi-component working fluid stream to a usable form of energy to form a spent, multi-component working fluid stream, and condensing the spent, multi-component working fluid stream to form the fully condensed, multi-component working fluid stream.

12. The method of claim 11, further comprising:

pressurizing the heated first high temperature heat transfer fluid stream to form a higher pressure, heated first high temperature heat transfer fluid stream, before being forwarded to the first stage of the heat exchange unit.

13. The method of claim 11, further comprising:

passing the flue gas stream through a large particle separator of a particulate separation and heat transfer subsystem to form a dust laden flue gas stream, pressurizing the dust laden flue gas stream to form a higher pressure, dust laden flue gas stream, filtering the higher pressure, dust laden flue gas stream to form a substantially dust free, higher pressure, flue gas stream, and transferring heat from the substantially dust free, higher pressure, flue gas stream to a second high temperature heat transfer fluid stream in a scrubber to form the cooled flue gas stream and a heated second high temperature heat transfer fluid stream, which is used to fully vaporize and superheat the partially vaporized, multi-component working fluid stream in the second stage of the heat exchange unit.

14. The method of claim 13, further comprising:

pressurizing the heated second high temperature heat transfer fluid stream to form a higher pressure, heated second high temperature heat transfer fluid stream, before being forwarded to the second stage of the heat exchange unit.

15. The method of claim 11, further comprising:

passing the hot air stream through a large particle separator of a particulate separation and heat transfer subsystem to form a dust laden hot air stream, pressurizing the dust laden hot air stream to form a higher pressure, dust laden hot air stream, filtering the higher pressure, dust laden hot air stream to form a substantially dust free, higher pressure, hot air stream, transferring heat from the substantially dust free, higher pressure, hot air stream to a first high temperature heat transfer fluid stream in a scrubber to form the cooled air stream and a heated first high temperature heat transfer fluid stream, which is used to partially vaporize the fully condensed, multi-component working fluid stream in the first stage of the heat exchange unit, passing the flue gas stream through a large particle separator of a particulate separation and heat transfer subsystem to form a dust laden flue gas stream, pressurizing the dust laden flue gas stream to form a higher pressure, dust laden flue gas stream, filtering the higher pressure, dust laden flue gas stream to form a substantially dust free, higher pressure, flue gas stream, and transferring heat from the substantially dust free, higher pressure, flue gas stream to a second high temperature heat transfer fluid stream in a scrubber to form the cooled flue gas stream and a heated second high temperature heat transfer fluid stream, which is used to fully vaporize and superheat the partially vaporized, multi-component working fluid stream in the second stage of the heat exchange unit.

16. The method of claim 15, further comprising:
pressurizing the heated first high temperature heat transfer fluid stream to form a higher pressure, heated first high temperature heat transfer fluid stream, before being forwarded to the first stage of the heat exchange unit, and
pressurizing the heated second high temperature heat transfer fluid stream to form a higher pressure, heated first high temperature heat transfer fluid stream, before being forwarded to the second stage of the heat exchange unit.

\* \* \* \* \*